Jan. 18, 1949.　　　S. B. GRISCOM ET AL　　　2,459,640
REGULATING SYSTEM
Filed June 2, 1947

WITNESSES:
Robert C. Baird
Dw. L. Groome

INVENTORS
Samuel B. Griscom and
Raymond L. Witzke.
BY
James N. Ely
ATTORNEY

Patented Jan. 18, 1949

2,459,640

UNITED STATES PATENT OFFICE 2,459,640

REGULATING SYSTEM

Samuel B. Griscom and Raymond L. Witzke, Pittsburgh, Pa., assignors to Westinghouse Electric Corporation, East Pittsburgh, Pa., a corporation of Pennsylvania Application June 2, 1947, Serial No. 751,810

7 Claims. (Cl. 322—24)

This invention relates to regulating systems.

An object of this invention is to provide a regulating system for a dynamo-electric machine.

Another object of this invention is to provide a regulating system for a dynamo-electric machine in which provision is made for insuring minimum excitation of the machine.

A more specific object of this invention is the provision, in a regulating system for a dynamo-electric machine having a voltage reference network for directionally controlling a self-excited exciter in response to load conditions, for modifying the operation of the voltage reference network to insure a predetermined minimum excitation of the dynamo-electric machine.

Other objects of this invention will become apparent from the following description when taken in conjunction with the accompanying drawing, in which.

Figure 1:
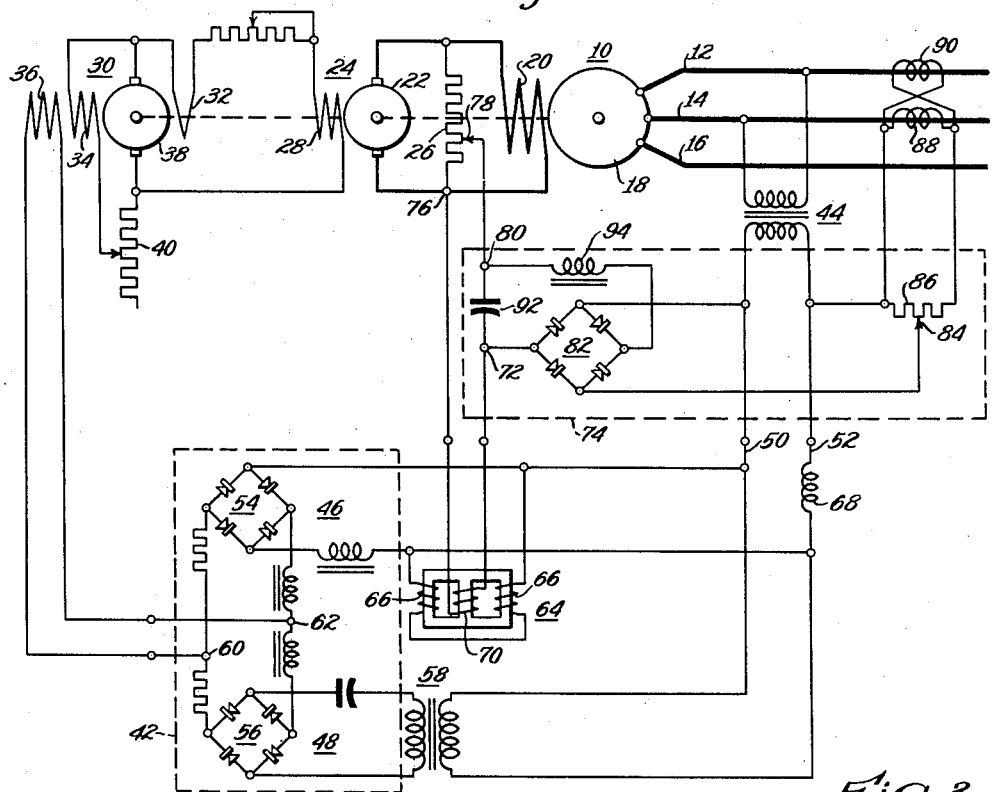
Figure 1 is a diagrammatic view of apparatus and circuits embodying the teachings of this invention.

Referring to the drawing and, in particular, to Fig. 1 thereof, there is illustrated a dynamo-electric machine 10, such as a generator or the like, for supplying a load represented by line conductors 12, 14 and 16. The generator 10 comprises the armature windings 18 connected to the line conductors 12, 14 and 16 and a field winding 20. The field winding 20 is connected across the armature windings 22 of the main exciter 24, a resistor 26 being connected across the field winding 20, the purpose of which will be explained more fully hereinafter. The main exciter 24 is also provided with a field winding 28, the energization of which is controlled by a pilot exciter 30.

In the embodiment illustrated, the pilot exciter 30 is of the self-excited or "series-tuned" type which normally operates along the linear part of its saturation curve. The exciter 30 is provided with a series field winding 32 for normally supplying the majority of the excitation requirements, and a shunt field winding 34 for supplying the remainder of the excitation of the exciter, and a control field winding 36 disposed to be directionally energized in response to the operation of the generator 10, the excitation of which is controlled by the main exciter 24.

As illustrated, the series field winding 32 is connected in series circuit between the armature windings 38 of the pilot exciter 30 and the field windings 28 of the main exciter 24. An adjustable resistor 40 is connected in circuit relation with the shunt field winding 34 for purposes of adjusting the degree of energization thereof. The series field winding 32 and the shunt field winding 34 of the pilot exciter 30 may be cumulative with the series field winding 32 providing slightly less than required sustaining field strength, and the shunt field winding 34 being only strong enough for adjusting the self-excitation field strength to compensate for manufacturing differences and installation adjustments or the like. On the other hand, the shunt field windings 34 may be wound to oppose the series field windings 32 where the windings 32 supply slightly more than required sustaining field strength.

As illustrated, the control field winding 36 is connected through a voltage reference network 42 and a potential transformer 44 to be supplied in accordance with the line voltage. The voltage reference network 42 illustrated is of the type disclosed and claimed in the copending application, Serial No. 567,256, filed December 8, 1944, now Patent No. 2,428,566, issued October 7, 1947, by E. L. Harder et al. and comprises a non-linear impedance circuit 48 connected through conductors 50 and 52 to be simultaneously energized from the transformer 44 in accordance with the line voltage. The non-linear impedance circuit 46 and the linear impedance circuit 48 are connected to rectifiers 54 and 56, respectively, the output terminals of the rectifying units being connected in series circuit relation with each other through suitable series connected resistors and series connected smoothing reactors. An insulating transformer 58 is illustrated as connected in the supply of the linear impedance circuit 48.

The control field winding 36 of the pilot exciter 30 is connected across the direct current series circuit connecting the rectifier units 54 and 56 at points 60 and 62, which for a predetermined line voltage are at zero potential. The impedance elements of the non-linear impedance circuit 46 and of the linear impedance circuit 48 have intersecting impedance characteristics and as the line voltage or generator terminal voltage fluctuates from a predetermined value which is to be maintained, the current drawn by the circuits varies with the result that an unbalanced condition between the output of the rectifying units 54 and 56 occurs and the control field winding 36 is energized in one or the other directions, depending upon the output of the unbalanced condition.

In the embodiment illustrated in Fig. 1, in order to modify the operation of the voltage reference network 42, a saturable core reactor 64 is disposed with its alternating current windings 66 connected across the conductors 50 and 52 which supply the voltage reference network. In this embodiment, a reactor 68 is preferably connected in series circuit in the conductor 52 for cooperating with the saturable core reactor 64 as will be explained more fully hereinafter.

In order to control the saturation of the saturable core reactor 64, a direct current control winding 70 is disposed on the middle leg of the reactor and is connected in circuit relation with two sources of direct current voltage. One of the terminals of the direct current control winding 70 is connected to an output terminal 72 of a measuring network 74, the other terminal of the direct current control winding 70 being connected through terminal 76, a section of resistor 26 and the adjustable tap 78 to the other output terminal 80 of the measuring network 74. Thus, the section of the resistor 26 connected in circuit relation with the direct current control winding 70 of reactor 64 provides a source of direct current voltage which is a measure of the voltage across the field winding 30 of the dynamo-electric machine 10.

The other source of direct current voltage for controlling the energization of the direct current control winding of the reactor 64 is represented as the output terminals 72 and 80 of the measuring network 74 and is supplied by the full wave rectifying unit 82, the output terminals of which are connected to terminals 72 and 80. As illustrated, one of the input terminals of the rectifying unit 82 is connected through an adjustable tap 84, a section of resistor 86 and the secondary winding of the potential transformer 44 to the other input terminal of the rectifying unit 82. The resistor 86 is connected across current transformers 88 and 90 which are disposed in inductive relation with the line conductors 14 and 12, respectively, so that a current flows through the resistor 86 which is a measure of the generator current. The voltage appearing across the resistor 86 is in phase with the voltage across the transformer 44 when the generator output is at unity power factor.

Thus, a voltage is impressed across the rectifying unit 82 which is a composite of the generator terminal voltage as represented by the potential across the secondary windings of transformer 44 and a potential drop which is a measure of the generator current as represented by the potential across the section of resistor 86 which is connected in circuit relation with the rectifying unit 82. The resulting direct current voltage from the rectifying unit 82 as measured across terminals 72 and 80 is an approximation of the watt output of the generator 10. In practice, this approximation is found to so closely follow the watt output that for purposes of this invention such direct current voltage can be taken as a measure of the watt output of the dynamo-electric machine 10. The capacitor 92 and inductor 94 connected across the rectifying unit 82 are for purposes of smoothing any ripple which may occur in the rectified voltage in accordance with well known practice.

The two sources of direct current voltage just described and which are utilized for controlling the energization of the direct current control winding 70 of the reactor 64 are of opposite polarity, it being noted that when the direct current voltage appearing across the section of resistor 26 connected between terminal 76 and tap 78 predominates over the direct current voltage across terminals 72 and 80, current does not flow in the direct current control winding 70 since the rectifying unit 82 effectively blocks such flow of current. On the other hand, if the direct current voltage appearing across terminals 72 and 80 of the measuring network 74 predominates over the direct current voltage across the section of resistor 26 connected between terminal 76 and tap 78, current will flow from the positive terminal of the rectifying unit 82 through the inductor 94, terminal 80, tap 78, a section of resistor 26, terminal 76 and direct current control winding 70 to the terminal 72 and the negative terminal of the rectifying unit 82 to effect the energization of the direct current control winding 70.

In operation, assuming that the generator 10 and the main exciter 24 and pilot exciter 30 are being driven by some suitable means (not shown) for supplying power at a constant voltage to a load (not shown), the windings 32 and 34 of the tuned pilot exciter 30 are sufficient for normally maintaining the excitation of the main exciter 24 and, consequently, the generator or dynamo-electric machine 10 to maintain constant voltage across the line conductors 12, 14 and 16. As the non-linear impedance circuit 46 and the linear impedance circuit 48 of the voltage reference network 42 are so selected that at the predetermined line voltage which is to be maintained the circuits 46 and 48 have intersecting impedance characteristics and the voltages across rectifying units 54 and 56 and at the points 60 and 62 are equal, a voltage does not appear across the control field winding 36.

If during normal operation of the system the line voltage should increase from the predetermined value, then the non-linear impedance circuit 46 draws more current than the linear impedance circuit 48 and the output voltages across the rectifying units 54 and 56 are unbalanced. With such an unbalanced condition, the larger potential across the rectifying unit 54 effects a voltage drop across the control field winding 36 in a direction to produce an action to oppose the excitation of the field windings 32 and 34 to decrease the output of the pilot exciter 30 and, consequently, decrease the excitation of the main exciter 24 with a corresponding decrease in excitation of the generator 10 to return the line voltage to the predetermined value.

If the change in the line voltage is a decrease, then the linear impedance circuit 48 draws more current than the non-linear impedance circuit 46 with the result that the potentials at terminals 60 and 62 become so unbalanced as to effect a voltage drop across the control field winding 36 in a direction to produce an action to aid the field windings 32 and 34 to increase the excitation of the tuned pilot exciter 30 and thereby effect an increase in the excitation of the main exciter 24 with a resulting increase in the excitation of the generator 10 to maintain the line voltage at its predetermined value.

The foregoing description of the operation of the regulating system is for a normal operation of the system, wherein the excitation of the generator 10 is maintained at a value above a predetermined minimum excitation. If in the operations just described, the voltage across the generator field 20 is increased with the result that the direct current voltage appearing across terminal 76 and tap 78 of the resistor 26 is increased to a value in excess of the direct current voltage appearing across terminals 72 and 80 which is a measure or an approximation of the watt output of the generator 10, then the measuring network 74 has no effect on the control of the excitation of the pilot generator 30 since the rectifying unit 82 of the measuring network 74 effectively blocks the flow of current resulting from such differential between the two sources of direct current voltage and current fails to flow in the direct current control winding 70 of the saturable reactor 64.

If during the normal operation of the system, the voltage across the control field winding 20 of the generator 10 should decrease to a value where the voltage drop between the terminal 76 and tap 78 across the section of resistor 26 is below the value of the direct current voltage across the terminals 72 and 80, then as a result of the differential of the two direct current voltages, current flows through the direct current control winding 70 of the reactor 64 to effect a lowering of the alternating current impedance of the alternating current winding 66 of the reactor 64. The reactor 64 thus cooperates with the series connected reactor 68 to effectively lower the voltage supplied to the voltage reference network 42.

As the input to the non-linear impedance circuit 46 and to the linear impedance circuit 48 has thus changed by reason of the decrease in the voltage across the supply to the respective circuits, the voltage across the rectifying units 54 and 56 is so varied that it tends to vary or change the current flowing through the control field winding 36 in a direction to produce or modify the action thereof to aid the action of the windings 32 and 34 to effectively increase the excitation of the pilot generator 30. By thus increasing the excitation of the pilot generator 30, the output thereof is increased to effect an increase in the excitation of the main generator 34 with a corresponding increase in excitation of the generator 10 to such an extent that a predetermined minimum excitation of the field winding 20 is maintained. It will be appreciated that the action of the reactor 64 is superimposed upon the normal functioning of the voltage reference network 42 so that where the normal operation of the network 42 in response to a change in line voltage is to effect either an increase or decrease in the excitation of the pilot exciter 30, the effect of the modification is additive thereto to further increase the excitation of the pilot exciter 30 or to so modify the decreasing effect as to insure that a minimum excitation of the generator 10 is maintained.

In the embodiment illustrated in Fig. 2, the reactor 64 is connected only in the linear impedance circuit 48 whereby only the linear impedance circuit 48 is modified in response to the differential of the two direct current voltages as the excitation of the field winding of the generator 10 is decreased to or below the predetermined minimum excitation value. Thus, the alternating current windings 66 of the reactor 64 are connected directly across the linear impedance circuit so that when the direct current control winding 70 of the reactor 64 is energized, such as when the direct current voltage across terminals 72 and 80 of the measuring circuit 74 predominates over the measure of the voltage across the field winding 20, the alternating current impedance of the winding 66 decreases and the linear element in the linear impedance circuit 48 draws more current with the result that the voltage across the rectifying unit 56 increases with respect to the voltage across the rectifying unit 54. By thus changing the relation of the voltages across the rectifying units 54 and 56, the voltage reference network functions to change the flow of current in the control field winding 36 in a direction to aid the action of the control field windings 32 and 34 to effectively increase the excitation of the pilot exciter 30 and thereby increase the excitation of the generator 10 to at least the predetermined minimum value.

As will be appreciated, if the modifying effect of the reactor 64 is superimposed on the linear impedance circuit 48 while the voltage reference network 42 is operating to correct for an increase in line voltage, then the reactor 64 functions to decrease the differential between the voltages across rectifying units 54 and 56 so that the opposing action of the control field winding 36 to the excitation of the field windings 32 and 34 is decreased somewhat so that, in effect, the excitation of the pilot exciter 30 is increased to the extent of the modification due to the action of the reactor 64.

On the other hand, if the regulator 64 is energized when the voltage reference network 42 is operating to correct for a decrease in line voltage, then the modifying action of the reactor 64 is additive to the action of the linear impedance circuit 48 whereby the differential in voltages across the rectifying units 54 and 56 is increased and the voltage drop across the control field winding 36 is increased to produce a larger action to aid the field windings 32 and 34 to increase the excitation of the pilot exciter 30 and effectively increase the excitation of the generator 10 to a value above the predetermined minimum excitation value.

Figure 2:
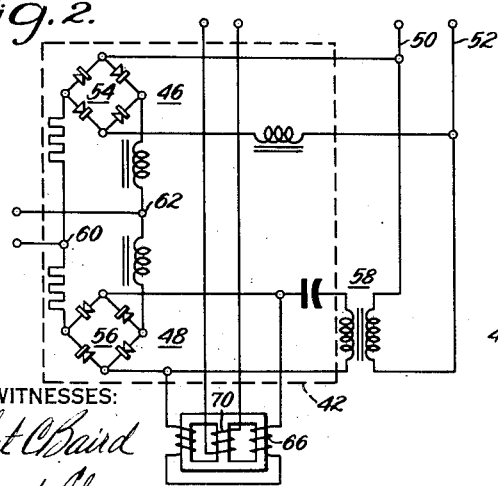
Fig. 2 is a diagrammatic view of another embodiment of this invention.
Figure 3:
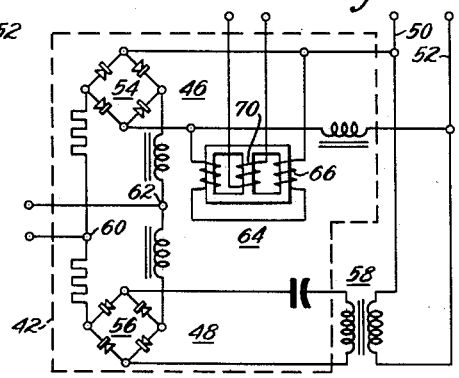
Fig. 3 is a diagrammatic view of apparatus and circuits constituting another embodiment of the teachings of this invention.

The embodiment of the invention illustrated in Fig. 3 is somewhat similar to that of Fig. 2, except that the alternating current windings 66 of the saturable core reactor 64 are connected across the non-linear impedance circuit 46 to modify the action of only that circuit as opposed to the linear impedance circuit 48. Thus, as the direct current control winding 70 of the reactor 64 is energized, the reactor 64 draws more current so that the voltage drop across the reactor 64 increases with the result that the voltage across the rectifying unit 54 decreases with respect to the potential across the rectifying unit 56 of the measuring network 42. In such instances the normal operation of the reactor 64 is to effect a voltage drop across the control field winding 36 of the pilot exciter 30 in a direction to produce an action to aid the field windings 32 and 34 to increase the excitation of the pilot exciter 30 and thereby effectively increase the excitation of the generator 10 to a value at least above the predetermined minimum excitation value.

The modifying action of the reactor 64 in this embodiment is superimposed upon the normal functioning of the voltage reference network 42 as described hereinbefore with respect to the embodiment of Fig. 2 so that regardless of the normal operation of the unmodified network 42 in response to a change in line voltage, the reactor 64 functions to, in effect, tend to increase the excitation of the pilot exciter 30 when the direct current control winding 70 is energized because of the differential of the direct current voltages described hereinbefore.

In each of the embodiments described, the system is very sensitive to changes in the field voltage of the generator 10 and as to the watt output therefrom for effecting a modification in the operation of the voltage reference network to insure correct operation of the pilot exciter 30 to maintain at least a predetermined minimum excitation of the generator 10. The systems described are efficient in operation and are formed of standard components and can be readily duplicated. The minimum excitation feature included in the regulating system shown and described provides an efficient control of the operation of the dynamo-electric machine.

We claim as our invention:

1. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watts output of the dynamo-electric machine, means for producing a direct current voltage which is a measure of the voltage across the field winding of the dynamo-electric machine, and means responsive to the differential of said direct current voltages only when said first direct current voltage is in excess of said second direct current voltage, said last responsive means being disposed in circuit relation with at least one of said impedance circuits for modifying the operation of the voltage network to maintain at least a predetermined minimum excitation of the dynamo-electric machine.

2. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watts output of the dynamo-electric machine, means for producing a direct current voltage which is a measure of the voltage across the field winding of the dynamo-electric machine, and a reactor having alternating current and direct current windings, the direct current windings being connected to be energized in response to the differential of said direct current voltages only when said first direct current voltage is in excess of said second direct current voltage, the alternating current windings of the reactor being connected in circuit relation with at least one of said impedance circuits to modify the operation of the voltage network when the direct current windings are energized to maintain at least a predetermined minimium excitation of the dynamo-electric machine.

3. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watts output of the dynamo-electric machine, means for producing a direct current voltage which is a measure of the voltage across the field winding of the dynamo-electric machine, and means responsive to the differential of said direct current voltages only when said first direct current is in excess of said second direct current voltage, said last responsive means being connected in the supply circuit of said non-linear and linear impedance circuits for modifying the operation of the voltage network to maintain at least a predetermined minimum excitation of the dynamo-electric machine.

4. In a regulating system for a dynamo-electric machine disposed to supply a load circuit, in combination, a self-excited-exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, and a reactor connected in the supply circuit of said non-linear and linear impedance circuits, the reactor having a direct current control winding disposed to be energized in response to the cooperative effect of the field voltage and the watt output of the dynamo-electric machine under predetermined operating conditions of the machine to modify the operation of the voltage network to maintain at least a predetermined minimum excitation of the dyamo-electric machine.

5. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watt output of the dynamo-electric machine, means for producing a direct current voltage which is a measure of the voltage across the field winding of the dynamo-electric machine, and a reactor connected in the supply circuit of said non-linear and linear impedance circuits, the reactor having a direct current control winding disposed to be energized in response to the differential of said direct current voltages only when said first direct current voltage is in excess of said second direct current voltage to thereby modify the operation of the voltage network to maintain at least a predetermined minimum excitation of the dynamo-electric machine.

6. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watt output of the dynamo-electric machine, means for producing a direct current voltage which is a measure of the voltage across the field winding of the dynamo-electric machine, and a reactor connected in the linear impedance circuit, the reactor having a direct current control winding disposed to be energized in response to the differential of said direct current voltages only when said first direct current voltage is in excess of said second direct current voltage to thereby modify the operation of the voltage network to maintain at least a predetermined minimum excitation of the dynamo-electric machine.

7. In a regulating system for a dynamo-electric machine disposed to supply a load circuit, in combination, a self-excited exciter for supplying the field-excitation of the dynamo-electric machine, a control field winding for the exciter disposed to be directionally energized, a voltage network comprising a non-linear impedance circuit and a linear impedance circuit connected to be simultaneously supplied from the load circuit and disposed when unbalanced to control the directional energization of the control field winding, means for producing a direct current voltage which is a measure of the watt output of the dynamo-electric machine, means for producing a direct current voltage which is a measure of the voltage across the field winding of the dynamo-electric machine, and a reactor connected in the non-linear impedance circuit, the reactor having a direct current control winding disposed to be energized in response to the differential of said direct current voltages only when said first direct current voltage is in excess of said second direct current voltage to thereby modify the operation of the voltage network to maintain at least a predetermined minimum excitation of the dynamo-electric machine.

SAMUEL B. GRISCOM.
RAYMOND L. WITZKE.

REFERENCES CITED

The following references are of record in the file of this patent:

UNITED STATES PATENTS

| Number | Name | Date |
| --- | --- | --- |
| 2,259,135 | Hill | Oct. 14, 1941 |
| 2,396,851 | Hyser | Mar. 19, 1946 |